United States Patent [19]

Sims

[11] Patent Number: 4,567,422
[45] Date of Patent: Jan. 28, 1986

[54] VOLTAGE REGULATOR WITH MAXIMUM CURRENT LIMIT

[75] Inventor: Cecil Sims, Rockford, Ill.

[73] Assignee: Sundstrand Corporation, Rockford, Ill.

[21] Appl. No.: 754,426

[22] Filed: Jul. 12, 1985

Related U.S. Application Data

[63] Continuation-in-part of Ser. No. 648,301, Sep. 7, 1984.

[51] Int. Cl.$^4$ .............................................. H02P 9/30
[52] U.S. Cl. ........................................ 322/25; 322/73
[58] Field of Search .................................. 322/22–25, 322/72, 73, 28, 59; 328/111, 112, 137; 307/84, 87

[56] References Cited

U.S. PATENT DOCUMENTS

| | | | |
|---|---|---|---|
| 3,209,233 | 9/1965 | Reuther | 322/24 |
| 3,484,704 | 12/1969 | Hungerford | 528/137 |
| 3,564,391 | 2/1971 | Dinger | 322/25 |
| 4,044,296 | 8/1977 | Dhyanchand et al. | 322/25 |
| 4,322,630 | 3/1982 | Mezera et al. | 307/87 X |
| 4,326,159 | 4/1982 | Aotsu et al. | 322/22 X |
| 4,403,292 | 9/1983 | Ejzak et al. | 307/71 |
| 4,442,396 | 4/1984 | Hucker | 322/25 X |
| 4,477,765 | 10/1984 | Glennon et al. | 322/25 X |

FOREIGN PATENT DOCUMENTS

| | | | |
|---|---|---|---|
| 1804130 | 4/1970 | Fed. Rep. of Germany | 322/22 |
| 813755 | 3/1981 | U.S.S.R. | 328/111 |
| 813768 | 3/1981 | U.S.S.R. | 328/111 |

Primary Examiner—R. J. Hickey
Attorney, Agent, or Firm—Wood, Dalton, Phillips, Mason & Rowe

[57] ABSTRACT

In a voltage regulator for a generating system having a main generator and an exciter, the exciter providing field current to the main generator, it is desirable to provide a maximum current limit on the generator output which also allows the voltage regulator to maintain excitation during a fault condition. The voltage regulator of the present invention includes a maximum current limit circuit which detects not only a high current condition, but also the number of phases in a polyphase generator output in a fault condition. The voltage regulator thereby limits the maximum current each type of fault can produce, thus providing highly desirable system characteristics for clearing faults, tripping circuit breakers and prolonging generator life.

13 Claims, 3 Drawing Figures

VOLTAGE REGULATOR WITH MAXIMUM CURRENT LIMIT

CROSS REFERENCE

This application is a continuation-in-part of Sims et al copending application, Ser. No. 648,301, filed Sept. 7, 1984.

TECHNICAL FIELD

The present invention relates generally to alternator control circuits, and more particularly to a voltage regulator for controlling the output of a brushless alternator.

BACKGROUND ART

Known brushless alternator systems comprising a main generator and an exciter for providing field current to the main generator include a voltage regulator for controlling the current delivered to a field winding of the exciter to in turn control the output voltage of the generator. These voltage regulators control exciter field current in accordance with the output voltage and/or output current of the main generator.

In an excessive current condition, such as a fault situation, the output voltage of the generator will drop significantly. The higher currents which are experienced in the fault condition can damage generator components, while a drop in the voltage out of the regulator can result in the loss of information stored in volatile memory components of systems being powered by the generator output. It is therefore desirable to limit current out of the generator, and at the same time maintain the excitation of the generator until the fault can be cleared.

Hucker U.S. Pat. No. 4,442,396, assigned to the assignee of the instant application, discloses a generator system which maintains excitation during a fault condition. The current limiting function is provided in the form of silicon controlled rectifiers which are "phased back" in the event of a fault so that the voltage at the output of the main generator armature can be maintained at a sufficiently high value to permit continued self-excitation.

The generating system of the Hucker application provides current limiting based on the highest phase current in a three phase generating system. This generating system does not take into account the fact that faults of different magnitude, such as three-phase shorts, single-phase to neutral shorts or two-phase to neutral shorts, require different levels of field excitation. Ideally, the voltage regulator will provide the same level of current limiting regardless of the type of fault.

In Applicants copending application, Ser. No. 648,301, a voltage regulator for a generating system controls exciter current as a function of the average of the three phase output voltage and the peak phase voltage. This voltage regulator provides a current limiting function when a three phase fault occurs, however it will not respond to effectively limit the maximum current when there is a single phase or two phase fault.

The present invention is directed to overcoming one or more of the problems as set forth above.

DISCLOSURE OF THE INVENTION

In accordance with the present invention, a voltage regulator for a generating system includes means for sensing three or more output parameters of the generator and means for controlling the generator output as a function of a selected one of the sensed parameters.

In a preferred embodiment of the invention, the voltage regulator includes first and second sensing means for sensing the average of the three-phase output voltage and the peak phase voltage, respectively. Third sensing means are also included for sensing the highest phase current and the number of phases in a high current condition. Means are coupled to the sensing means for generating first, second and third pulse width modulated signals having a pulse width dependent upon the average voltage, the peak phase voltage and the number of phases in a high current condition, respectively. Means are coupled to the generating means for comparing the three pulse width modulated signals and developing a fourth pulse width modulated signal dependent upon the pulse width modulated signal having the narrowest pulse width. Means are responsive to the fourth pulse width modulated signal for controlling the exciter to in turn regulate the output of the main generator.

The voltage regulator of the present invention permits independent control of the exciter field current in accordance with the sensed average voltage, the sensed peak voltage or the number of phases in a high current condition. Accordingly, the voltage regulator maintains control over the output of the main generator even in the event of transient disturbances, a loss of phase at the generator output or a current fault affecting any of the three phases of the output.

Furthermore, the voltage regulator of the present invention provides a maximum current limit at a finite current value, the value being selected to lessen abuse on generator components. The current limit circuit limits the maximum current each type of fault can produce, the end result being equal maximum current values for any type of fault.

By limiting fault current, regardless of the type of fault applied, highly desirable system characteristics are produced for clearing faults, tripping breakers and prolonging generator life.

BEST MODE FOR CARRYING OUT THE INVENTION

Figure 1:
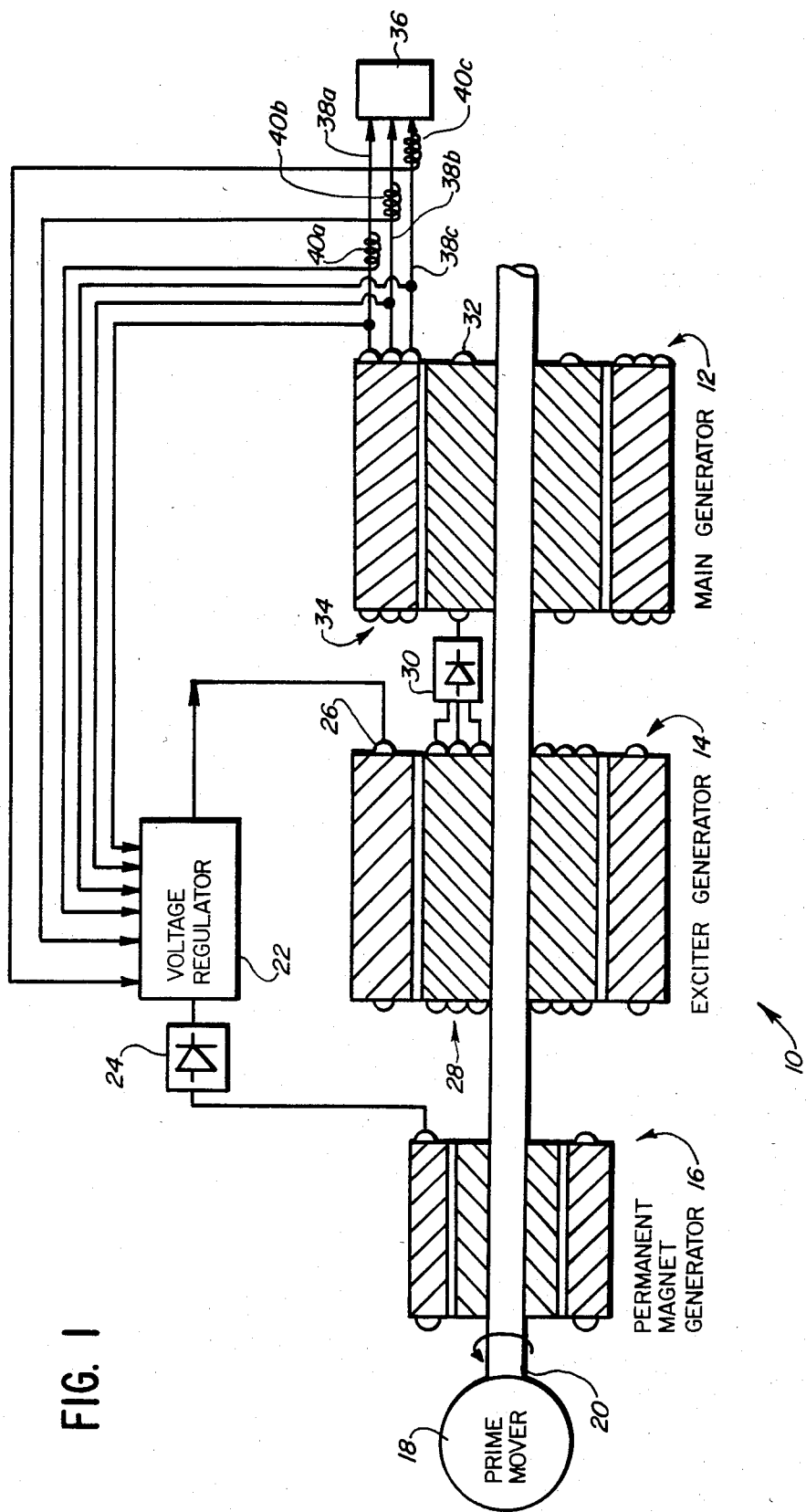
FIG. 1 is a combined diagrammatic illustration-block diagram of a brushless alternator system incorporating the voltage regulator of the present invention.

Referring now to FIG. 1, a brushless alternator 10 includes a main generator 12, an exciter 14 for providing main field current to the generator 12 and a permanent magnet generator (PMG) 16. Each of the main generator 12, exciter 14 and PMG 16 are driven by a prime mover 18 through a common shaft 20.

A voltage regulator 22 receives the power developed by the PMG 16 via a rectifier 24 and delivers a controlled current to a field winding 26 of the exciter 14. The current level delivered to the field winding 26 is a function of three or more output parameters of the main generator 12, as discussed more specifically below.

As is conventional in brushless alternators, rotation of the shaft 20 by the prime mover 18 results in generation of a polyphase voltage in armature windings 28 of the exciter 14. This polyphase power is rectified by a rectifier bridge, illustrated generally at 30, and the rectified power is coupled to a field winding 32 of the main generator 12. The current in the field winding 32 and the rotation of the shaft 20 sets up a rotating magnetic field in space occupied by a set of main generator armature windings 34. The armature windings 34 develop polyphase output power which is delivered to a load 36 over a power bus 38 comprising at least three conductors 38a, 38b and 38c.

Output parameters of the main generator 12 are sensed at a point of regulation, or POR, near the load. In the preferred embodiment, two of these parameters are the average of the three phase output voltage and the peak phase output voltage from the generator 12. A third output parameter is sensed by means of differential protection current transformers, or DPCT's 40a, 40b and 40c which sense the phase currents in the power bus conductors 38a–38c, respectively. Signals representing these output parameters are coupled to the voltage regulator 22.

Figure 2:
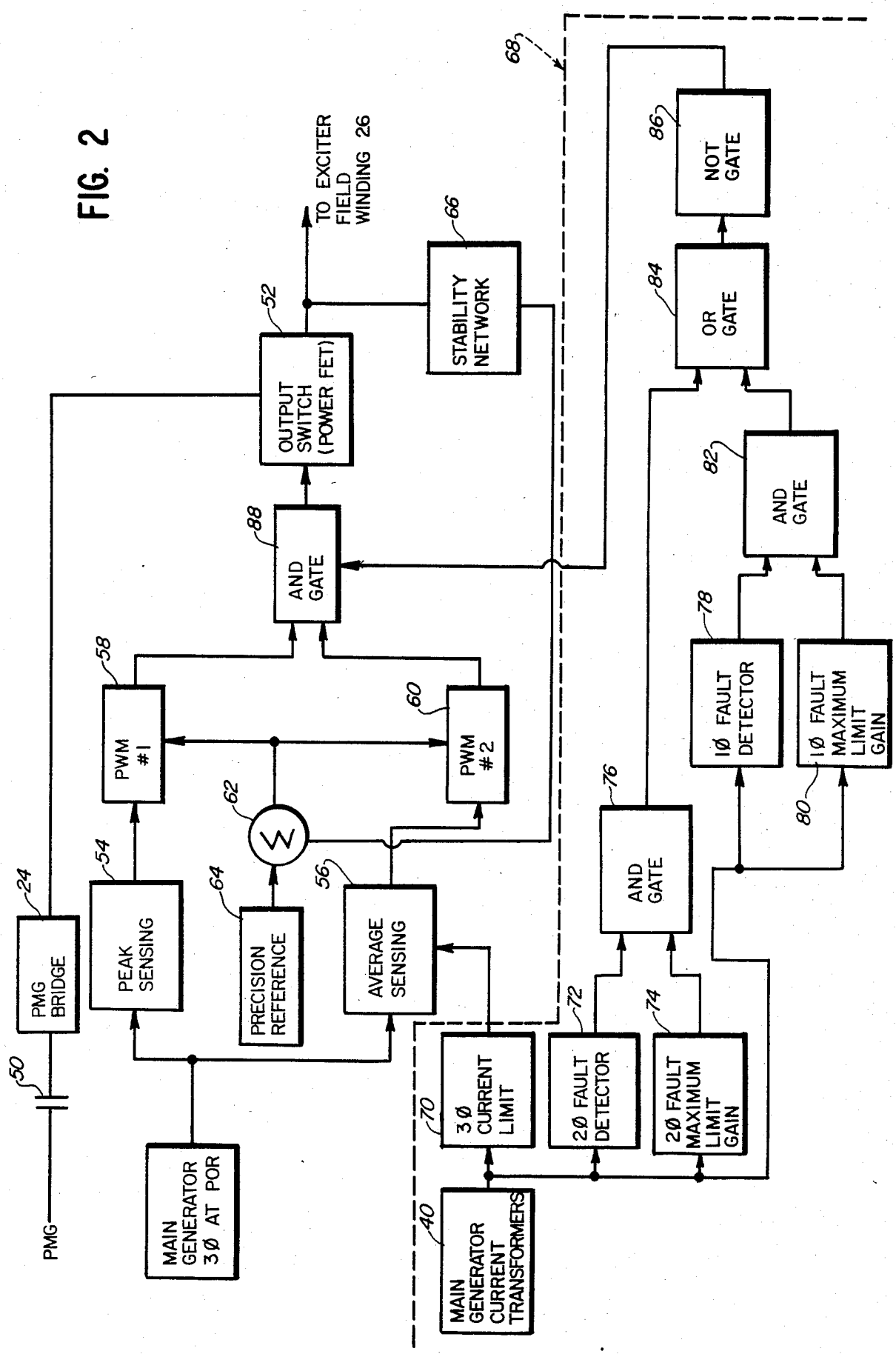
FIG. 2 is a block diagram of the voltage regulator shown in FIG. 1.

Referring now to FIG. 2, there is illustrated in block diagram form the voltage regulator 22 shown in FIG. 1. The polyphase output from the PMG 16 is coupled through a set of breaker contacts, illustrated generally at 50 to the bridge rectifier 24. The output of the rectifier 24 is coupled to an output switch 52 which, in the preferred embodiment, comprises a power FET. The output switch 52 is operated in a controlled fashion to modulate the flow of power to the exciter field winding 26.

The polyphase output voltage from the main generator is coupled to first and second sensing circuits 54, 56 for sensing the peak or high phase voltage and the average of the polyphase output voltage, respectively. The outputs from the first and second sensing circuits 54, 56 are coupled to first and second pulse width modulation or PWM amplifiers 58, 60, respectively. The PWM amps 58, 60 receive a signal from a summing junction 62 which develops an error signal representing the difference between the output of a precision reference circuit 64 and a feedback signal derived from the output of the power switch 52 and a stability network 66. The stability network 66 provides a low level negative feedback signal to the precision reference circuit 64 to prevent instability.

The maximum current limit function of the present invention is indicated generally at 68. According to the invention, the second or average sensing circuit 56, receives, in addition to the three phase voltage signal, a signal from a three phase current limit circuit 70 representing the current in each of the conductors 38a–38c from the DPCT's 40a–40c. The output of the average sensing circuit 56 is then modified in accordance with the output of the three phase current limit circuit 70 if the load current becomes excessive to a level where the output voltage is substantially reduced.

The three phase current limit circuit 70 will effectively limit current from the generator output and maintain excitation when a three phase to neutral fault condition exists. Additionally, the maximum current limit circuit 68 includes means for limiting generator output current when a single phase or dual phase fault condition exists.

A two phase fault detector circuit 72 and a two phase fault maximum limit gain circuit 74 are both coupled to an AND gate 76 which produces a pulse width modulated signal which operates only when a two phase fault is present. Likewise, a single phase fault detector 78 and a single phase fault maximum limit gain circuit 80 are coupled to an AND gate 82 which produces a pulse width modulated signal only when a single phase fault is present. The outputs of the AND gates 76, 78 are coupled to an OR gate 84 which is in turn coupled to an inverter or NOT gate 86 whose output is a pulse width modulated signal, the pulse width being dependent upon the number of phases in a fault current condition.

A gain function selected in each of the two phase fault maximum limit gain circuit 74, the single phase fault maximum limit gain circuit 80 and the three phase current limit circuit 70 allow the effect of each type of fault to be separately adjusted to produce equal maximum current limits for any type of fault condition.

The PWM amplifiers 58, 60 develop pulse width modulated signals each having a pulse width dependent upon the output of the respective sensing circuit 54 or 56. The pulse width modulated signals have a frequency equal to 1200 hertz for a 400 hertz generator output when all three phases are present, 800 hertz when only two phases are present and 400 hertz when only one phase is present. The outputs from the PWM amplifiers 58, 60 and the NOT gate 86 are coupled to an AND gate 88 which compares the three pulse widths and passes the signal having the narrowest pulse width to the output switch 52. The pulse signal from the AND gate 88 controls the exciter field current, and hence the output of the main generator 12.

Figure 3:
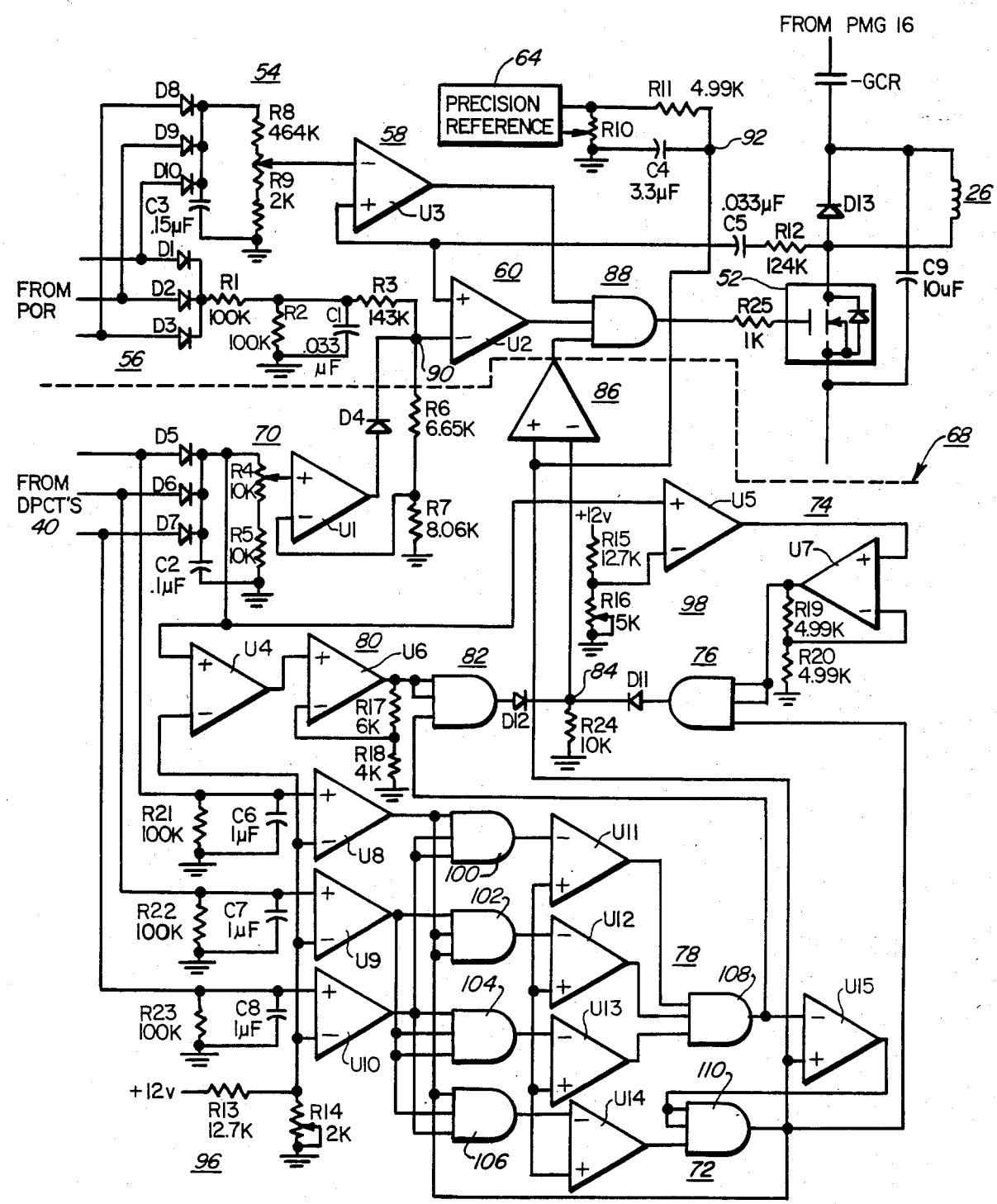
FIG. 3 is a schematic diagram of the voltage regulator shown in block diagram form in FIG. 2.

Referring now to FIG. 3, the POR voltages are coupled through respective diodes D1–D3 and a resistor R1 to a parallel combination of a resistor R2 and a capacitor C1. A voltage $V_{C1}$ on the capacitor C1 is a DC level approximately equal to the average of the three phase output voltages of the main generator 12. The voltage $V_{C1}$ includes a series of ripple peaks caused by half wave rectification and filtering of the POR voltage. The voltage across the capacitor C1 is combined at a node 90 with an output signal developed by an amplifier U1 which develops a series of pulses from the signals developed by the DPCT's 40. The output from the amplifier U1 represents the highest current of the polyphase output from the generator. The combined signal at the node 90 is utilized to limit the current to the exciter field, and hence to limit the generator output, by pulsing the AND gate 88 at a rate determined by the ripple on the signals from the DPCT's 40.

The node 90 is connected to the inverting input of an operational amplifier U2 having a high gain. The amplifier U2 also includes a noninverting input which is coupled to a node 92 which comprises the summing junction 62 shown in FIG. 2. The signal from the node 90 normally varies between limits which are above and below the level of the signal from the node 92. The amplifier U2 compares the signals from the nodes 90, 92 and, due to the high gain thereof, produces a pulse width modulated signal having a pulse width which is a function of the limits on the signal from the node 90 and the level of the signal at the node 92. The output from the amplifier U2 is coupled to an input of the AND gate 88.

A second input to the AND gate 88 is coupled to the output of the first PWM amplifier 58. The amplifier 58 includes an operational amplifier U3 having a noninverting input which is coupled to the node 92 and an inverting input which is coupled to a series of diodes D8–D10 and a capacitor C3 through a resistor R8 and potentiometer R9. The diodes D8–D10 are in turn coupled to the three phase output of the generator 12 at the point of regulation POR. The signal coupled to the inverting input of the amplifier U3 is a sawtooth wave which is compared against the reference voltage from the node 92 to develop a PWM signal having a pulse width dependent upon the peak values of the sawtooth wave and the level of the signal from the node 92.

The AND gate 88 may be provided with an additional input (not shown) which receives an enable signal. If the enable signal is low, the AND gate 88 output is disabled to shut off the regulator. If the enable signal is high, the AND gate 88 is enabled to permit control of the exciter field.

A potentiometer R10, connected to the precision reference 64, is adjustable to permit varying reference levels to be set according to the desired POR voltage.

In a high current situation, such as a three phase fault, the signal at the node 90 representing the average three phase voltage will decrease. It is desirable, however, to maintain excitation during such a fault condition. The three phase current limit circuit 70, sensing the increase in current, will subsequently cause the voltage at the node 90 to increase, preventing the pulse width out of the amplifier U2 from narrowing. Excitation is thereby maintained while maximum available current is limited.

When a single or dual phase fault condition exists, the resultant current may not be of a sufficient magnitude to cause the three phase current limit circuit 70 to operate effectively. The maximum current limit circuitry of the present invention, as discussed hereinafter, is utilized to provide maximum current limiting in a single or dual phase fault situation.

The voltage at a node 94, representing the highest current of the polyphase output from the generator, is connected to the non-inverting input of operational amplifiers U4 and U5. The inverting input of the operational amplifier U4 is a voltage signal from a reference circuit 96 having a voltage signal value dependent upon the position of a potentiometer R14. The inverting input of the operational amplifier U5 is a voltage signal from a reference circuit 98, the voltage signal value being determined by the position of a potentiometer R16. The value of the potentiometer R14 is chosen so that the output of the operational amplifier U4 is high when a single phase fault is present. Likewise, the value of the potentiometer R16 is selected to produce a high output from the operational amplifier U5 when a dual phase fault exists.

The output of the operational amplifier U4 is coupled to the non-inverting input of an operational amplifier U6. The output of the operational amplifier U5 is coupled to the non-inverting input of an operational amplifier U7. In each of the operational amplifiers U6, U7 the inverting input is a feedback signal through a voltage divider circuit R17, R18 and R19, R20 respectively.

The operational amplifier U6 produces a PWM signal at its output with the pulse width acting to limit the maximum current which can be produced in a single phase fault condition. The operational amplifier U7 performs a similar function producing a PWM signal with the pulse width limiting the maximum current which may be produced in a dual phase fault condition. The output from the operational amplifier U6 is coupled to the input of the AND gate 82 while the output of the operational amplifier U7 is coupled to the input of the AND gate 76. The additional input to each of the AND gates 76, 82 is a signal from the respective two phase fault and single phase fault detector circuits 72, 78, as discussed more specifically below.

Each of the three current signals from the DPCT's 40 is coupled through an associated RC network to the non-inverting inputs of operational amplifiers U8–U10. The outputs of the operational amplifier U8–U10 will be high when the current input for the respective output phase is in a fault condition. The outputs will be low when the currents are at an acceptable level.

The outputs of the operational amplifiers U8–U10 are coupled, as shown, to the inputs of AND gates 100, 102, 104 and 106. When the current level of all three phases is normal the outputs of the AND gates 100, 102, 104 and 106 will be low. The AND gate 100 will have a high output when both of the operational amplifiers U8 and U10 have high outputs; the output of the AND gate 102 will be high when the outputs of the operational amplifiers U8 and U9 are high; the output of the AND gate 104 will be high when the outputs of operational amplifiers U9 and U10 are high; and the output of the AND gate 106 is high when the outputs of the operational amplifiers U8, U9 and U10 are all high.

Operational amplifiers U11–U14 act as inverters, or NOT gates, inverting the outputs from the AND gates 100, 102, 104 and 106, respectively. The outputs of the operational amplifiers U11–U13 are then coupled to an AND gate 108. Consequently, the output of the AND gate 108 will be high when a single phase fault exists and low when a two phase fault exists.

The output of the operational amplifier U14 is coupled to an AND gate 110 along with the output of an operational amplifier U15. The operational amplifier U15 is an inverter, or NOT gate, which inverts the output from the AND gate 108. The output of the AND gate 110 will be high therefore, when a two phase fault exists, and low when a single phase fault exists.

The output of the AND gate 108 is further coupled to the AND gate 82 along with the PWM signal from the operational amplifier U6. The AND gate 82 has as its output the PWM signal of the operational amplifier U6 when a single phase fault exists. Since, when a dual phase fault is present, the output of the AND gate 108 is low, the output of the AND gate 82 will necessarily remain low. Similarly, the output of the AND gate 110 is coupled to the AND gate 76 along with the PWM signal from the operational amplifier U7. The AND gate 76 will therefore pass the PWM signal of the operational amplifier U7 when a two phase fault is present, but assumes a low state when there is a single phase fault.

The outputs of AND gates 76 and 82 are coupled through diodes D11 and D12 respectively to a node acting as the OR gate 84. The OR gate 84 has as an output signal the PWM signal of the AND gate 76 when a dual phase fault exists, or the PWM signal of the AND gate 82 when a signal phase fault exists. The OR gate 84 is connected to the inverting input of an operational amplifier 86, with the non-inverting input of operational amplifier 86 coupled to the precision reference signal at the node 92. The output of the operational amplifier 86 is an input to the AND gate 88.

The operational amplifier 86 acts as an inverter, or NOT gate, with its output normally being high. However, when a single phase or dual phase fault is present, the output of the operational amplifier 86 will be a PWM signal with the pulse width determined in order to limit the maximum current each of these types of faults can produce.

The output of the AND gate 88 is coupled to the gate electrode of the power FET 52 through a resistor R25 which controls the rise time of the gate drive to the FET.

The PMG is coupled to the exciter field winding 26 through a set of contacts GCR, operated by a generator control unit (not shown).

Under normal steady-state operating conditions the signal from the PWM amplifier 60 has a narrower pulse width than the signal from the PWM amplifier 58 and the NOT gate 86 remains high. The switch 52 is thereby controlled in accordance with the output from the operational amplifier U2. Hence, under normal conditions, the current delivered to the exciter field is controlled as a function of the average of the three phase output voltage. However, when a phase drops out or is heavily loaded, the output signal from the PWM amplifier 58 has a narrower pulse width than the output from the PWM amplifier 60 and hence the switch 52 and the current to the exciter field are controlled in the response to the high phase voltage as sensed by the sensing circuit 56. The high phase limiting will continue until one phase becomes loaded to a point where current limiting becomes effective via amplifier U1, or OR gate 84, or until normal conditions are restored.

Where a high current is present in any of the output phases, the maximum current limit circuit 68 will limit the current output from the generator at a finite value and maintain excitation to allow for the fault to be cleared or the circuit breaker to be tripped. By adjusting the potentiometers R4, R14 and R16 the maximum current limit circuit can be balanced to allow equal limits of output current which can be produced, regardless of the type of fault, thereby prolonging generator life.

It should be noted that if any of the sensing circuits 54, 56 or 68 become disconnected from the output of the generator, the output of the corresponding PWM amp 58 or 60, or NOT gate 86, is forced high, thereby permitting control to be continued by the remaining sensing circuit. This feature allows for control of the AND gate 88 under such a condition.

The use of a power FET as a switch 52 is desirable since the transistor is a voltage controlled device requiring very little current. Hence, control of the exciter field is facilitated since a low power logic device (i.e. the AND gate 88) may be used to effect direct control.

The present invention is effective to control generator output over a wide range of operating conditions. Moreover, the system is not limited to the sensing of the output voltage and/or current but may be responsive to other parameters, as desired.

I claim:

1. A voltage regulator for a generating system having a main generator and an exciter providing field current to the main generator, comprising:
    means coupled to the main generator for sensing first, second and third operating parameters thereof;
    means coupled to the sensing means for generating first, second and third pulse width modulated (PWM) signals based upon the first, second and third sensed operating parameters, respectively;
    means coupled to the sensing means for developing a signal for modifying one of the first or second PWM signals based upon the third operating parameter thereof;
    means coupled to the generating means for comparing first, second and third PWM signals and developing a fourth PWM signal responsive to the first, second or third PWM signal having the narrowest pulse width; and
    means responsive to the comparing means for controlling the exciter to in turn regulate the output of the main generator.

2. The voltage regulator of claim 1 wherein, the main generator develops polyphase output voltages and wherein the first and second sensing means include means for sensing the average of the polyphase output voltages and the peak phase voltage, and the third sensing means includes means for sensing the highest phase current in the main generator output and the number of phases in a high current condition.

3. The voltage regulator of claim 1 wherein the comprising means comprises an AND gate.

4. The voltage regulator of claim 1, wherein the sensing means includes means for developing signals representing the first, second and third operating parameters and wherein the generating means includes second, third and fourth means coupled to the developing means, each for comparing the signals representing the first, second and third sensed parameters with a reference signal, the comparing means generating an output having a high or low state depending upon the relative levels of the respective parameter signal and the reference signal coupled thereto to generate the PWM signals.

5. The voltage regulator of claim 1, wherein the controlling means comprises a FET coupled to the exciter field winding.

6. The voltage regulator of claim 3, wherein the controlling means comprises a FET having a gate electrode coupled to the output of the AND gate.

7. In a voltage regulator for a generating system having a main generator which develops three phase output power and an exciter for providing field current to a field winding of the main generator, including means for developing a first signal representing the average of the three phase output voltage of the main generator and means for developing a second signal representing the peak phase output voltage of the main generator, the improvement comprising:
    means coupled to the main generator for sensing current in each of the three phases of the main generator output;
    means responsive to the sensing means for determining the number of phases of the main generator output in a high current condition;
    means responsive to the sensing means for developing a signal representing the highest phase current in the main generator output and means for generating a third signal representing the highest phase current signal and the average output voltage signal;
    means for converting the second and third signals into first and second pulse width modulated (PWM) signals each having a pulse width dependent upon the level of the respective second or third signal relative to a reference;
    means responsive to the determining means for generating a third PWM signal based upon the number of phases of the main generator output in a high current condition; and
    means responsive to only one of the PWM signals at any time for controlling the exciter to in turn regulate the output of the main generator.

8. The voltage regulator of claim 7, wherein the controlling means comprises an AND gate for comparing the first, second and third PWM signals and passing only that PWM signal having the narrowest pulse width at any time.

9. The voltage regulator of claim 7, wherein the controlling means comprises a FET coupled to the exciter field winding.

10. The voltage regulator of claim 8, wherein the controlling means further comprises a FET having a gate electrode coupled to the output of the AND gate.

11. A voltage regulator for a brushless alternator having a main generator which develops three phase output power, an exciter for providing field current to a field winding of the main generator and a permanent magnet generator (PMG) for providing field current to a field winding of the exciter, including means for developing a first signal representing the average of the three phase output voltage of the main generator and means for developing a second signal representing the peak phase output voltage of the main generator, the improvement comprising:

means coupled to the main generator for sensing current in each of the three phases of the main generator output;

means responsive to the sensing means for developing a signal representing the highest phase current in the main generator output and for generating a combined signal representing the highest phase current and the average voltage signal;

means for converting the second and combined signals into first and second pulse width modulated (PWM) signals each having a pulse width dependent upon the level of the respective second or combined signal relative to a reference;

means coupled to the sensing means for generating a third PWM signal based upon the sensed current in each of the three phases of the main generator output, relative to a reference;

an AND gate coupled to the outputs of the first, second and third PWM signals for comparing the pulse widths thereof the AND gate passing to an output thereof the PWM signal having the narrowest pulse width; and means coupled to said AND gate output and to the PMG and the field winding of the exciter for controlling the exciter field current in accordance with the passed PWM signal.

12. The voltage regulator of claim 11, wherein the generating means for the third PWM signal includes means for producing a PWM signal having a pulse width dependent upon the number of phases of the main generator output in a high current condition.

13. The voltage regulator of claim 11, wherein the controlling means comprises a FET having a gate electrode coupled to the output of the AND gate.

* * * * *